July 5, 1960 J. F. RINGELMAN 2,944,210

THERMOCOUPLE MAGNETIC AMPLIFIER

Filed Oct. 27, 1955 2 Sheets-Sheet 1

INVENTOR
JOHN F. RINGELMAN

BY [signature] [signature: R. I. Tompkins]
ATTORNEYS

July 5, 1960 J. F. RINGELMAN 2,944,210

THERMOCOUPLE MAGNETIC AMPLIFIER

Filed Oct. 27, 1955 2 Sheets-Sheet 2

INVENTOR
JOHN F. RINGELMAN

BY [signature] R. I. Tompkins
ATTORNEYS

United States Patent Office
2,944,210
Patented July 5, 1960

2,944,210

THERMOCOUPLE MAGNETIC AMPLIFIER

John F. Ringelman, Catonsville, Md., assignor, by mesne assignments, to the United States of America as represented by the Secretary of the Navy Filed Oct. 27, 1955, Ser. No. 543,286

2 Claims. (Cl. 323—89)

This invention relates generally to amplification of low level direct current signals and more particularly to control circuits for use with signal amplifiers for elimination of zero signal drift.

In the detection of low voltage signals such as may be derived from a thermocouple source in a temperature regulating system, it is important that signal errors arising from local or ambient causes, such as temperature change, variation in magnetic or resistance factors as between paired parts of the equipment, input voltage variation and other causes, be reduced or eliminated. To obtain successful control of zero signal drift it is not sufficient to neutralize drift due to a single cause but it becomes important to combine the basic amplifier and all neutralizing factors in a single effective unit.

An important object of the invention, therefore, is to provide a unified mechanism and circuitry for reduction or elimination of zero signal drift. An object, also, is to provide means for zero drift elimination which functions effectively with magnetic amplifying units. Another object is to provide a combined magnetic amplifier and zero drift circuit which operates successfully with low level input voltages.

Other objects and many of the attendant advantages of this invention will be readily appreciated as the same becomes better understood by reference to the following detailed description when considered in connection with the accompanying drawings wherein.

Figure 1:
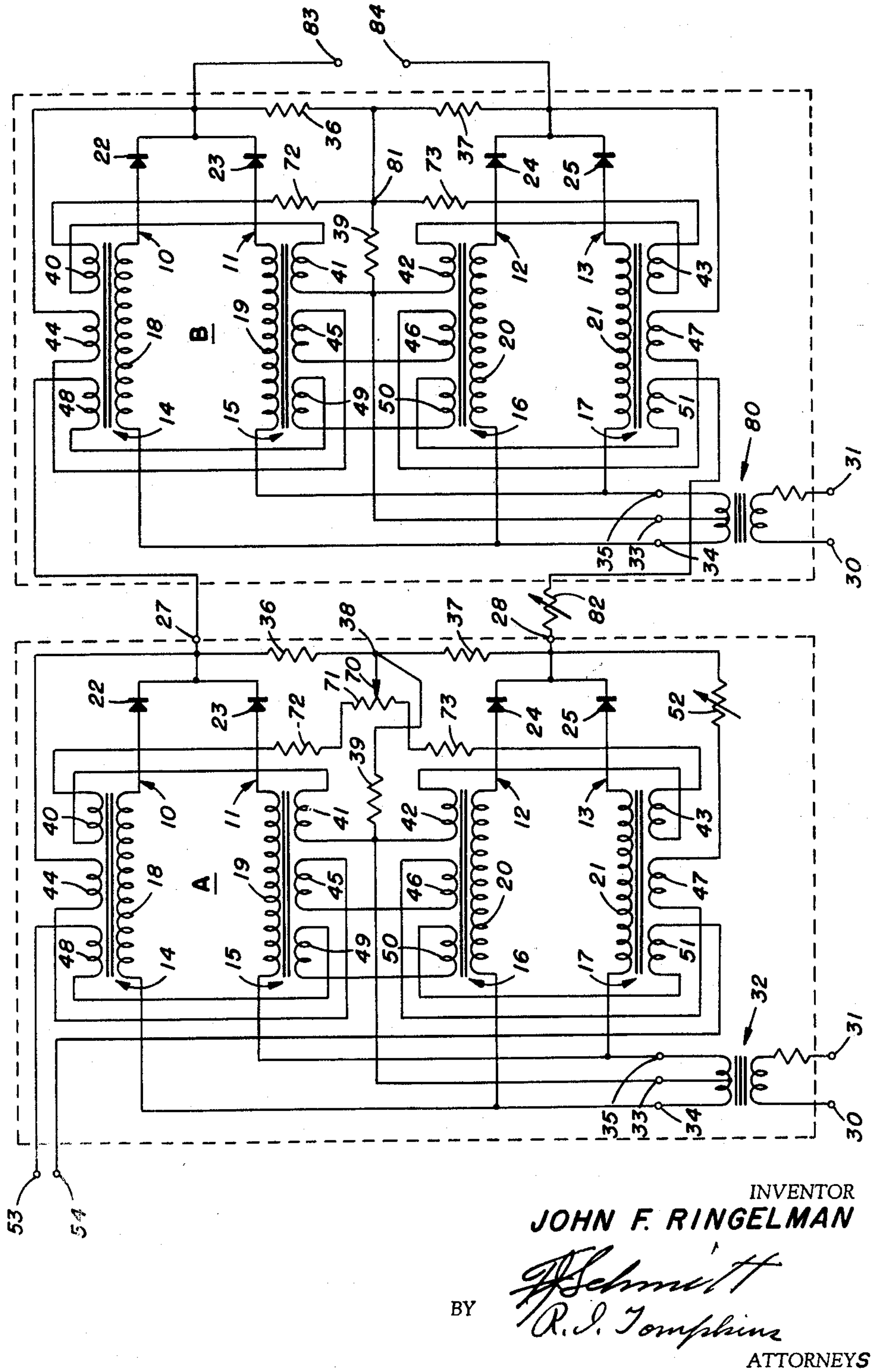
Fig. 1 is an electrical diagram of the control circuits.

Referring to Fig. 1 there is disclosed a magnetic amplifier which may be used with thermocouples or similar low level voltage devices. This amplifier is shown in two stages, designated A and B, which are in general similar, stage B differing over stage A only in certain components permitting control of greater power than stage A. Because of this similarity, the same numerals are applied to similar parts in both stage circuits and the following description of stage A applies in general to stage B.

Stage A is basically a full wave, balanced center-tapped circuit operating in push-pull and having four branches 10, 11, 12 and 13, each branch containing a toroidal reactor numbered respectively 14, 15, 16 and 17 with corresponding load coils 18, 19, 20 and 21. Saturating rectifiers 22, 23, 24 and 25 are connected in series with respective reactor windings 18, 19, 20 and 21, rectifiers 22 and 23 being connected to the stage A output terminal 27 and rectifiers 24 and 25 being connected to the stage A output terminal 28. Electrical power is supplied to the reactor circuits from alternating current source terminals 30 and 31 through saturating power transformer 32, the secondary of this transformer being tapped to provide the center-tap terminal 33, as well as full wave terminals 34 and 35. Transformer terminal 34 connects to input terminals 27 and 28 through two circuits, one including reactor load coil 18, rectifier 22 and input terminal 27 and the other including the reactor coil 20, rectifier 24 and input terminal 28. Transformer terminal 35 connects to input terminals 27 and 28, also, through two circuits one circuit including reactor coil 19, rectifier 23 and input terminal 27 and the other circuit including reactor coil 21, rectifier 25 and input terminal 28. Between the input terminals 27 and 28 are load resistors 36, 37 connected in series and the center tap transformer terminal 33 connects to a point 38 between these resistors through a bias coil resistor 39.

Three windings or coils are applied to each reactor load coil in such proximity thereto as to secure an effective modification of the reactor flux. These coils will be described as bias coils 40, 41, 42 and 43, feedback coils 44, 45, 46 and 47, and signal coils 48, 49, 50 and 51. The bias coils are connected in two parallel circuits, there being two coils in series in each circuit, the points of connection of these circuits being at the terminal 38 between the load resistors 36 and 37 and at the center transformer tap terminal 33 to be energized by any voltage which may appear across resistor 39. In this manner a direct current may be applied to the bias coils such as to develop a flux opposed to the reactor load flux. Thus, bias coil 40 opposes reactor coil 18, bias coil 41 opposes reactor coil 19, bias coil 42 opposes reactor coil 20, and bias coil 43 opposes reactor coils 21. To permit increase in current in one of the parallel bias circuits with simultaneous decrease in the other of the parallel circuits, the connection of the circuits to point 38 is made through a slide 70 movable on a potentiometer coil 71 of uniform resistance a unit length and series connected in the bias coil circuits, so that, by manual adjustment, the bias current in two bias coils, as 40 and 41, may be increased while the bias current in coils 42 and 43 is simultaneously decreased. Additional current limiting resistors 72 and 73 may be included, one on either side of the slide resistor 71.

The four feedback coils 44, 45, 46 and 47 are connected in series between the stage output terminals 27 and 28, the coil windings being so disposed as to develop a negative or degenerative effect on the reactor flux. A variable resistor 52 is included in series in the feedback coil circuit. The purpose of the feedback coils is to reduce overall gain change due to environmental conditions and to reduce the speed of electrical action of the amplifier.

Figure 3:
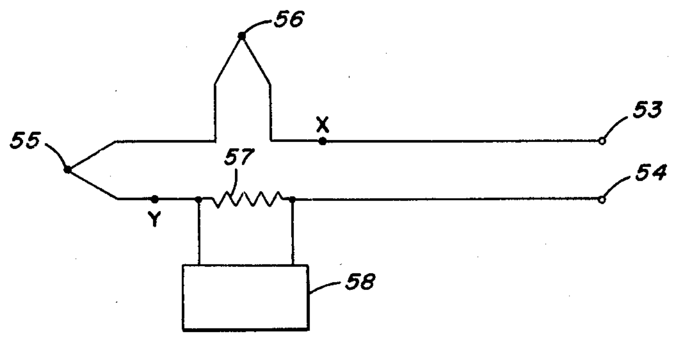
Fig. 3 is a diagram of a thermocouple circuit applicable to the control circuits of Figs. 1 and 2.

The four signal coils 48, 49, 50 and 51 are also series connected and arranged to oppose the reactor coil flux in reactors 14 and 15 and increase the flux in reactors 16 and 17. The outside terminals 53 and 54 of the signal circuit normally connect to the signal supply, such as a thermocouple unit in a temperature regulating system, as illustrated in Fig. 3. In this unit, thermocouple 55 is adapted for application to the heated space subject to regulation, thermocouple 56 is positioned in the constant temperature region, resistor 57 is located in circuit between thermocouple 55 and signal coil terminal 54 to establish a reference voltage and element 58, an independent direct current voltage source, is connected to resistor 57 in such series as to produce a fixed reference voltage across this resistor opposing the voltage of thermocouple 55.

As previously indicated, stage B circuit duplicates stage A, generally, the distinctions being that in stage B a non-saturable power transformer 80 is used and the variable resistor-slide element, 70—71, in the bias circuits of stage A is omitted, the bias circuits being connected directly to the transformer center tap terminal 33 at the fixed point 81. The signal circuit of stage B connects to stage A output terminals 27 and 28, a variable coupling resistor 82 being connected between terminal 28 and the stage B signal coil 51. Output terminals 83 and 84 serve for connection to the control circuit load, such as a servomechanism for maintaining the controlled space temperature constant.

The operation of the control circuit, as applied, for example, to a temperature regulating system may now be described. Alternating current for the magnetic amplifiers 14, 15, 16 and 17 is supplied from source terminals 30 and 31 through transformer 32. Since rectifiers 22, 23, 24 and 25 are connected each in series with the associated reactor coils 18, 19, 20, and 21, when the source current is applied with zero control signal at 53, 54, these reactors become quickly saturated, current pass-alternately through reactor coils 18 and 20 and 19 and 21 and dummy loads 36 and 37 to the transformer center tap 33.

During one half cycle of supply voltage from transformer 32, rectifiers 22 and 24, for example, allow current to pass through reactor coils 18 and 20, respectively, and a voltage is developed across the dummy load resistors 36 and 37. Under ideal conditions the electrical constants of the rectifiers, reactors and other circuit elements would be identical and the voltages appearing across resistors 36 and 37 would be equal, resulting in zero voltage across output terminals 27 and 28. In the opposite half current cycle the same result would occur. In actual practice, however, there is a small output at zero signal input due to variation in electrical characteristics of component elements and variation in external conditions, this output being known as zero signal drift, the maximum drift being designated as D*pi*.

To illustrate the mode of neutralizing this drift, assume that due to differences in characteristics reactor 14 saturates more quickly than reactor 16, producing a larger voltage across load resistor 36 than reactor 16 produces across resistor 37, thereby developing a drift voltage between terminals 27, 28. This unbalanced condition may now be corrected by shifting the slide 70 on coil 71 in the bias coil circuit so as to direct more bias current to bias coil 40 and less current to bias coil 42, thus regaining a zero voltage at terminals 27 and 28.

While the bias circuits as above described may be energized by a constant direct current voltage source to correct for structural dissimilarities, zero drift is at times due to external conditions such as temperature changes, which produce an unbalanced shifting of the operating points of the reactors. To correct for such shifts, the power for the bias circuits is supplied directly from the center-tap return circuit, as shown, with the slide 70 connected on the positive side of resistor 39 and the bias coils 41 and 42 to the negative side of this resistor. In this way, a voltage change at the load terminals 27 and 28 due to temperature variation in the reactors will produce a neutralizing effect in the bias coils to bring the drift to zero.

An additional cause of zero signal drift is variation in the power voltage as transmitted to the amplifiers through transformer 32, such a voltage change occurring during circuit operation usually producing a different effect in the four circuit branches resulting in an unbalanced voltage across output terminals 27 and 28. To overcome this condition, use is made of a saturating transformer thereby insuring a constant average value per half cycle of line voltage even though the line voltage supplying the transformer primary varies over a wide range.

Figure 2:
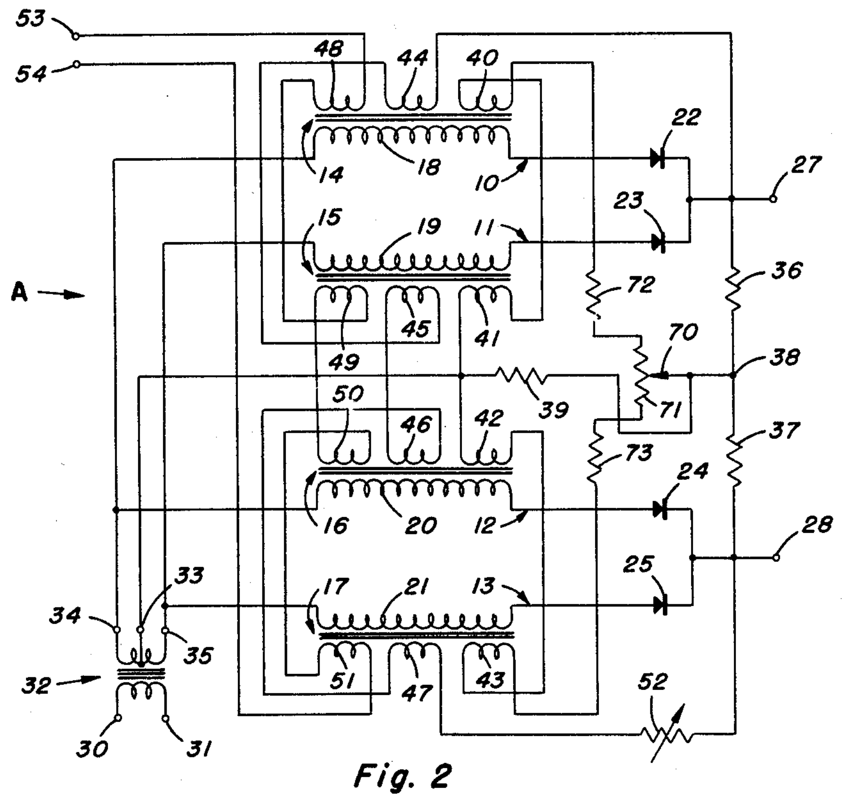
Fig. 2 is a diagram of the main section of the control circuit.

In use, for example, as a temperature regulator, the thermocouple unit of Fig. 3 is connected at terminals 53—54 to corresponding terminals in the signal circuit of Fig. 2. Initially the two thermocouples 55 and 56 are of equal temperature and, hence, the voltage across terminals X—Y is zero. If the temperature of the cold junction at 56 is maintained constant, the voltage across X—Y will be proportional to the difference temperature of the two junctions. In a temperature regulating system where the temperature around the hot junction is of the desired magnitude, the voltage appearing at terminals 53 and 54 should be zero, and to accomplish this result, the resistor 57 is placed in series with the thermocouples, and a voltage equal and opposite to that at terminals X—Y is applied to resistance 57 by a variable reference voltage 58. When the temperature around the hot junction changes, an uncompensated voltage appears at the signal input 53—54 and in amplified values at the output terminals 27, 28 of stage A and 83, 84 of stage B where connection is made to a servomechanism operative to change the temperature surrounding thermocouple 55 in such sense as to bring output terminals 53—54 back to zero. At this time the temperature of the controlled area is the one called for by the reference voltage 58, zero signal drift having been effectively and quickly reduced or eliminated through the action of the bias and feedback circuits with the aid of the saturating power transformer 32. In tests made with the described amplifier circuits, the D*pi* is less than 0.01 microwatt under conditions of 10% variation in either direction of supply voltage and frequency and for a variation of ambient temperature from −65° to +100° C.

While a single potentiometer coil 71 is indicated for bias connection as applied to a single pair of reactors it is apparent that this coil 71 and slide 70 may be duplicated and each coil connected to a separate pair of reactors, as 14, 16 and 15, 18, so that slide adjustment may be made to correct zero signal drift of different values in the separate reactor pairs.

Obviously many modifications and variations of the present invention are possible in the light of the above teachings. It is therefore to be understood that within the scope of the appended claims the invention may be practiced otherwise than as specifically described.

What is claimed is:

1. A magnetic amplifier circuit comprising input alternating current source terminals, a saturating transformer connected to said source terminals having a secondary provided with full wave and center taps, a conductor connected to said center tap, a pair of saturable reactors each having a pair of load windings having input terminals and output terminals, circuit means connecting the input terminal of one load winding of each reactor to one of said full wave taps, circuit means connecting the input terminal of the other load winding of each reactor to the other full wave tap, a rectifier provided with an output terminal and having an input terminal connected to the output terminal of each load winding, a pair of reactor circuit output terminals, circuit means connecting the output terminals of the rectifiers respectively associated with each of said reactors to one of said reactor circuit output terminals, a load resistor connected in series between said conductor and each of said reactor circuit output terminals, a bias coil positioned in juxtaposition to each of said load windings to oppose saturation thereof, a resistor connected in series with said center tap conductor, circuit means connecting the bias coils of each reactor in series with each other and in parallel with said resistor, said circuit means for connecting said bias coils to said resistor including a slide and variable resistor with the slide movable on the variable resistor whereby the voltage applied to said bias coils may be varied, said slide being connected to the conductor at the juncture of said load resistors, and the variable resistor being connected in series between at least two of said bias coils whereby shifting of said slide simultaneously increases current flow in one bias coil and reduces current in the other bias coil.

2. In a magnetic amplifier circuit including a source saturating current transformer having full cycle and center taps, a reactor load winding, a rectifier and a load resistor connected in series between each of said full wave taps and said center tap, an additional reactor load winding and a rectifier connected in series with each other and connected in parallel with each of said first named series connected reactor load winding and rectifiers, load terminals connected to said circuit at the high potential side of said load resistors, and separate control coils in proximity to said reactors for modifying the flux flow in said reactors when control current flows therein: means for preventing zero signal drift voltage at said load terminals comprising a bias coil in proximity to each reactor for modifying the magnetic state of the reactor, a bias coil resistor connected in series between the juncture of said load resistors and center tap, and connections from the high and low voltage sides of said bias coil resistor through each of said bias coils to effect a flow of direct current through said coils, additional means for speeding the action of said zero signal drift voltage prevention means including negative feed back coils connected to said load terminals and in operative proximity to said reactor load windings, the connection between said bias coils and the high voltage side of said bias coil resistor comprising a slide resistor connected between bias coils having connection to opposite full wave source transformer taps, and a slide connected to the high potential side of said bias coil resistor and movable on said slide resistor, whereby the voltage applied to one bias coil may be increased while at the same time the voltage applied to another bias coil is reduced.

References Cited in the file of this patent

UNITED STATES PATENTS

| | | |
|---|---|---|
| Re. 24,068 | Geyger | Oct. 4, 1955 |
| 2,338,423 | Geyger | Jan. 4, 1944 |
| 2,414,936 | Edwards et al. | Jan. 28, 1947 |
| 2,722,654 | Sikorra | Nov. 1, 1955 |
| 2,725,519 | Malick et al. | Nov. 29, 1955 |
| 2,765,374 | Louden | Oct. 12, 1956 |
| 2,773,235 | Malick | Dec. 4, 1956 |
| 2,795,652 | Malick et al. | June 11, 1957 |